(12) United States Patent
Chung et al.

(10) Patent No.: US 9,288,301 B2
(45) Date of Patent: Mar. 15, 2016

(54) SMART WATCH

(71) Applicant: Electronics and Telecommunications Research Institute, Daejeon (KR)

(72) Inventors: Eui-Sok Chung, Daejeon (KR); Yun-Keun Lee, Daejeon (KR); Jeon-Gue Park, Daejeon (KR); Ho-Young Jung, Daejeon (KR); Hoon Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 22 days.

(21) Appl. No.: 14/227,354

(22) Filed: Mar. 27, 2014

(65) Prior Publication Data

US 2014/0378185 A1  Dec. 25, 2014

(30) Foreign Application Priority Data

Jun. 20, 2013  (KR) .......... 10-2013-0071141

(51) Int. Cl.
| | |
|---|---|
| *H04B 1/38* | (2015.01) |
| *H04M 1/725* | (2006.01) |
| *G06F 1/16* | (2006.01) |
| *G04G 21/04* | (2013.01) |
| *H04B 1/3827* | (2015.01) |
| *H04M 1/00* | (2006.01) |
| *H04M 1/57* | (2006.01) |

(52) U.S. Cl.
CPC ............ *H04M 1/7253* (2013.01); *G04G 21/04* (2013.01); *G06F 1/163* (2013.01); *H04B 1/385* (2013.01); *H04B 2001/3861* (2013.01); *H04M 1/57* (2013.01)

(58) Field of Classification Search
CPC ....................................................... H04M 1/21
USPC ................................ 455/41.1–41.3, 557, 567
See application file for complete search history.

(56) References Cited

U.S. PATENT DOCUMENTS

| D617,661 S | 6/2010 | Nara et al. | |
|---|---|---|---|
| 2012/0108215 A1* | 5/2012 | Kameli | 455/412.2 |
| 2014/0098067 A1* | 4/2014 | Yang et al. | 345/175 |
| 2014/0120983 A1* | 5/2014 | Lam | 455/557 |

FOREIGN PATENT DOCUMENTS

KR  10-0808634  2/2008

* cited by examiner

*Primary Examiner* — Lee Nguyen
(74) *Attorney, Agent, or Firm* — Staas & Halsey LLP

(57) ABSTRACT

A smart watch in accordance with an embodiment of the present invention comprises: a first smart member configured to receive a voice signal sent from a mobile terminal, transform the input voice of a user to a voice signal, and send the voice signal to the mobile terminal while in talk mode; and a second smart member configured to input a control command about the talk mode into the first smart member, and transform the voice signal to voice and output the voice.

10 Claims, 3 Drawing Sheets

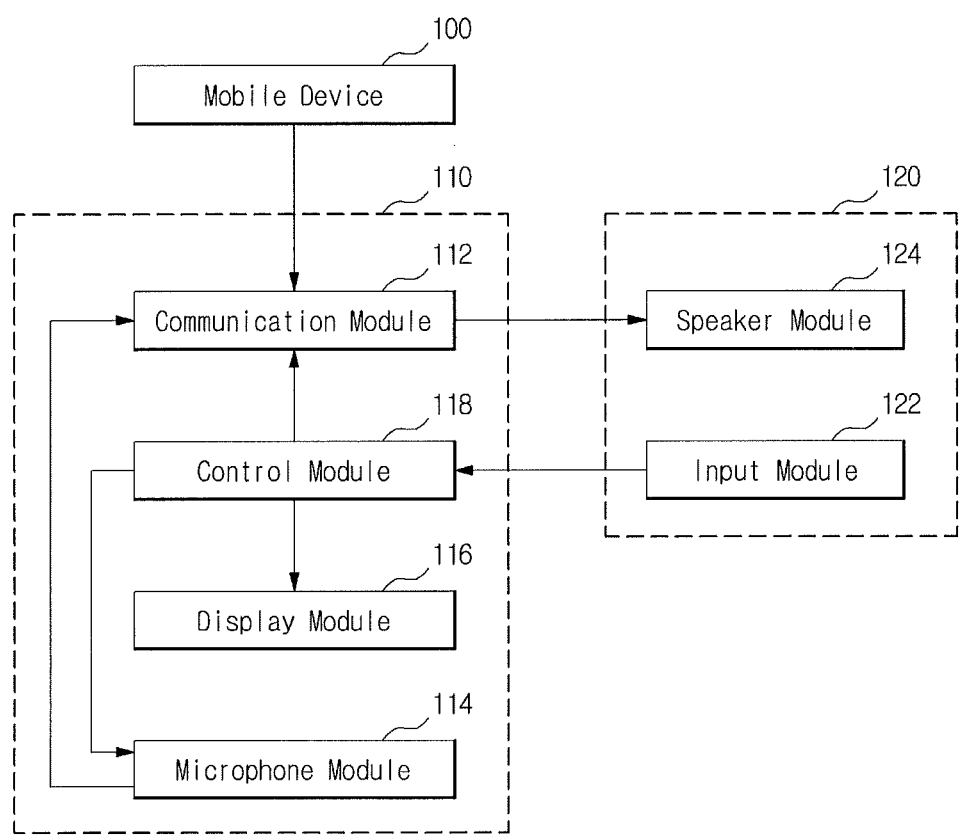

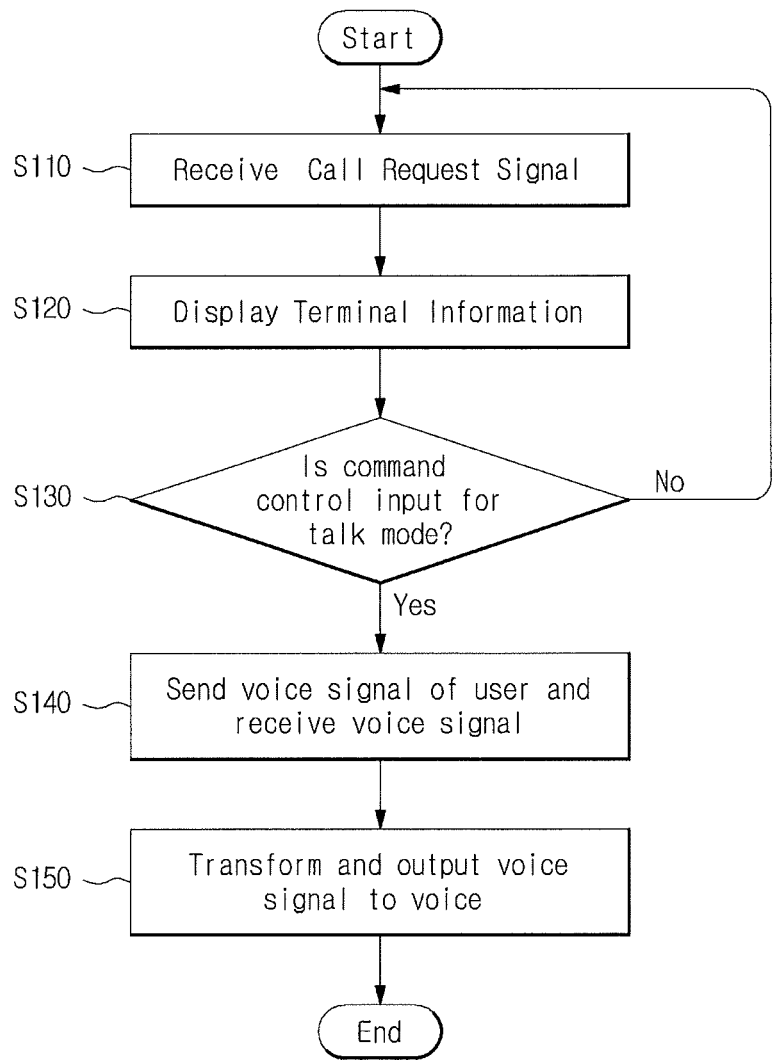

SMART WATCH

CROSS-REFERENCE TO RELATED APPLICATIONS

This application claims the benefit of Korean Patent Application No. 10-2013-0071141, filed with the Korean Intellectual Property Office on Jun. 20, 2013, the disclosure of which is incorporated herein by reference in its entirety.

BACKGROUND

1. Technical Field

The present invention relates to a smart watch, and more specifically to a smart watch that facilitates a call with an external terminal.

2. Background Art

Nowadays, the needs of mobile terminal having a Touch Screen Panel (TPS) have been growing.

Generally when a mobile terminal having a touch screen panel is in an idle mode displaying an idle screen, it can happen to have an unwanted input onto the panel for various cases such as when the mobile terminal is inside a pocket, an erroneous input, or a finger brushing. Therefore the mobile terminal having the touch screen panel has a touch screen penal lock key separately in order to avoid the unwanted operation keeping the panel off-status all the time.

Also, when a call is made when the touch screen panel of the mobile terminal is in the idle mode having the panel off-status, if the touch screen panel turns on automatically, unwanted operation may occur. Therefore, a touch screen panel for an ordinary mobile terminal stays in off-status even when a call is made and a user has to manipulate a calling-key and/or an end-key to receive or decline the call.

Accordingly, a mobile terminal having a conventional touch screen panel needs at least 3 individual keys.

However, the fact that having and using the touch screen panel requires at least 3 more individual keys in addition to the panel is less suitable for a structure such as a smart watch where subminiaturizing is important.

Also, phone conversation using a smart watch usually requires a headset because talking in public place is not easy even though smart phone itself provides a speaker and a microphone. Talking by use of a headset has an issue that people have to wear the headset all the time.

SUMMARY

The present invention provides a smart watch that facilitates a call with an external terminal.

A smart watch in accordance with an embodiment may include a first smart member configured to receive a voice signal received from a mobile terminal, transform inputted user's voice to a voice signal and send the voice signal to the mobile terminal in a talk mode; and a second smart member configured to receive a control command for the talk mode of the first smart member and transform the voice signal input from the first smart member into voice and output the voice.

The first smart member in accordance with an embodiment includes: a microphone module configured to transform the user's voice to the user's voice signal; a communication module configured to send the user's voice signal and receive the voice signal; and a control module configured to control the microphone module and the communication module to enables a talk with the mobile terminal while in the talk mode based on the control command.

The first smart member of the smart watch in accordance with an embodiment includes a display module configured to display at least one of terminal information, call information, time information, date information, email information, and text message information of the mobile terminal. The communication module of the smart watch in accordance with an embodiment receives a call request signal sent from the mobile terminal before receiving the voice signal.

The communication module of the smart watch in accordance with an embodiment receives a call request signal sent from the mobile terminal before receiving the voice signal and the control module, when receiving a call request signal, controls to produce at least one of vibration and ring by employing a predetermined call notification algorithm.

The first smart member of the smart watch in accordance with an embodiment includes a display module configured to display at least one of terminal information, call information, time information, date information, email information, and text message information of the mobile terminal, and the control module controls to display the terminal information on the display module when the call request signal is input, and controls to display the call information on the display module by enabling the talk mode when the control command is transferred from the second smart member.

The terminal information of the smart watch in accordance with an embodiment includes at least one of a user name and a mobile number of the mobile terminal, and the call information includes at least one of call start time and call elapse time of the mobile terminal.

The second smart member of the smart watch in accordance with an embodiment includes an input module configured to receive the control command input from the user; and a speaker module configured to transform the voice signal received from the first smart member into voice and output the voice.

The first smart member of the smart watch in accordance with an embodiment receives a call request signal sent from the mobile terminal before receiving the voice signal, and produces at least one of vibration and ring by employing a predetermined call notification algorithm and the input module is configured to receive a control command for the talk mode when at least one of the vibration and the ring is produced by the first smart member The smart watch in accordance with an embodiment includes a connection member configured to connect the first and second smart members electrically and transfer the control command and the voice signal.

The second smart member of the smart watch in accordance with an embodiment performs near field communication with the first smart member.

The smart watch in accordance with an embodiment, when receiving a call request signal sent from a mobile terminal, by using the first smart member worn on a wrist of a user and the second smart member worn on a finger of the user and inter-operating with the first smart member, enables a talk mode by inputting a control command to the second smart member; and has an advantage of being able to talk with a mobile terminal through a speaker module in the second smart member and a microphone module in the first smart member.

The smart watch in accordance with an embodiment, makes the first smart member worn on a wrist of the user be located near to the mouth when the user puts a finger worn the second smart member on the ear to talk, thereby increasing a user's convenience, not requiring the user to do extra an action when on a talk.

BRIEF DESCRIPTION OF THE DRAWINGS

FIG. 2 presents a block diagram of a smart watch structure in accordance with an embodiment of the present invention.

FIG. 3 presents a flow chart showing how a smart watch is operated in accordance with an embodiment of the present invention.

DETAILED DESCRIPTION

Figure 1:
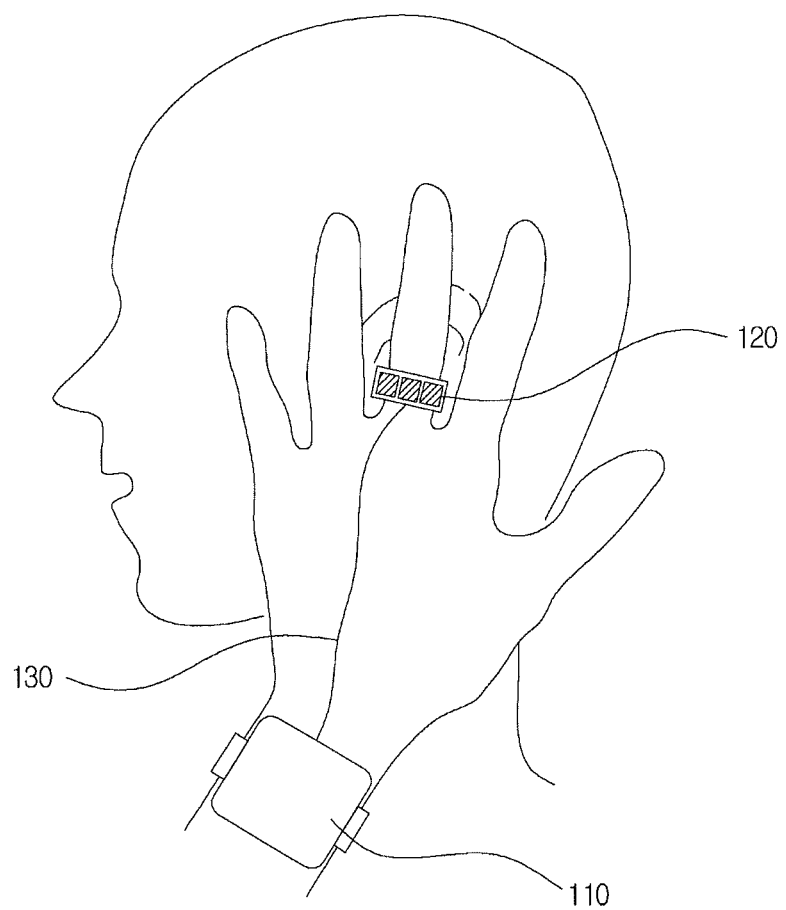
FIG. 1 presents an example of wearing a smart watch in accordance with an embodiment of the present invention.

Hereinafter, a desirable embodiment of the present invention will be described in detail with reference to the accompanying drawings. Identical or corresponding elements will be given the same reference numerals, regardless of the figure number. Throughout the description of the present invention, when describing a certain relevant conventional technology is determined to evade the point of the present invention, the pertinent detailed description will be omitted. Hereinafter a desirable embodiment of the present invention will be described but its technical ideas shall not be limited to it and can be embodied in various forms permutated.

FIG. 1 presents an example of wearing a smart watch in accordance with an embodiment of the present invention.

As presented in FIG. 1, a smart watch includes a first smart member 110 for a user to wear on a wrist and a second smart member 120 for a user to wear on a finger.

The first and second smart members 110, 120 in FIG. 1 represents to be electrically connected by a connection member 130, but the first and second smart members 110, 120 can perform near field communication and the connection is not limited thereto.

Here, the first smart member 110 can perform a part of functions of a smart phone (a mobile communication terminal), communicate with any mobile terminal, and display text for inputted user's voice.

The first smart member 110 may include a body (not depicted) which has a plurality of modules with electronic circuits and a wearing member (not depicted) which combined to the body and be worn on a wrist of the user and is not limited to the present embodiment.

In addition, the first smart member 110, when in a talk mode, can transform an inputted user's voice to a voice signal and send the voice signal to the mobile terminal and can receive the voice signal from the mobile terminal.

At this moment, the first smart member 110, when in a text transfer mode, can transform the inputted user's voice to text, display the text, and transfer the text to the mobile terminal in accordance with an command input from a user, and is not limited to the present embodiment.

The second smart member 120, interoperating with the first smart member 110, inputs a control command to communicate with the mobile terminal, enables the first smart member 110 to be in the talk mode, and transforms the voice signal received therein from the first smart member 100 to voice and outputs the voice.

The second smart member 120 may include a body (not depicted) having at lease one module which has electronic circuits connected with the plurality of modules in the first smart member 110. As presented in FIG. 1, the second smart member can be embodied as a ring shaped object like a ring but is not limited thereto.

In addition, the smart watch may include a connection member 130 configured to connect the first and second smart members 110, 129 electrically. FIG. 1 represents the first and the second smart member 110, 120 are connected each other through the connection member 130; however, the connection member 130 may not be required.

Here, the smart watch that does not have the connection member 130 enables the first and second smart members 110, 120 to perform near field communication so that the first and second smart members 110, 120 can communicate each other wirelessly, and it is not limited thereto.

Here, as presented in FIG. 1, how to use a smart watch for a user will be described briefly.

The first smart member 110, when receiving a call request signal from any mobile terminal, gives a user a notice about a call by producing at least one of vibration and ring by employing a predetermined call notification algorithm.

At this moment, the user inputs a control command through the second smart member 120 to enable the first smart member 110 to be in the talk mode and moves the second smart member 120 adjacently to the ear, that is, moves the finger worn the second smart member 120 adjacently to the ear.

After that, the user can talk with the mobile terminal by inputting the user's voice into the first smart member 110 adjacent to the user's mouth, while listening the voice output from the second smart member 120 through his/her ear.

The above description is an example of how to use a smart watch in accordance with an embodiment of the present invention, and is not limited to the present embodiment.

FIG. 2 presents a block diagram of a smart watch structure in accordance with an embodiment of the present invention.

As represented in FIG. 2, a smart watch may include the first smart member 110 and the second smart member 120.

The first smart member 110 may operate for a plurality of modes, receive at least one of a call request signal from any mobile terminal 100, voice signal, and text signal, and can send at least one of user's voice signal and a text signal to the mobile terminal 100, and is not limited thereto.

First of all, the first smart member 110 may include a communication module 112, a microphone module 114, a display module 116, and a control module 118.

The communication module 112 receives a talk request signal from the mobile terminal 100 and transfers the talk request signal to the control module 118.

After that, the communication module 112 operates in accordance with control of the control module 118, when the voice signal of a user is input thereto, sends the voice signal of the user to the mobile terminal 100, and can transfer a voice signal received from the mobile terminal 100 to the second smart member 120.

Here, the microphone module 114 operates in accordance with control of the control module 118 and transforms inputted user's voice to the voice signal and transfers the voice signal to the communication module 112.

When the communication module 112 receives the call request signal, the display module 116 may operate as a talk mode in any mode out of a plurality of modes in accordance with the control module 118, and display at least one of terminal information, call information, time information, date information, email information, and text message information of the mobile terminal 100.

Here, the terminal information may include at least one of a user name and a mobile number of the mobile terminal 100 and the call information may include at least one of call start time and call elapse time of the mobile terminal 100, and is not limited to the present embodiment.

The control module 118, when a call request signal is received in the communication module 112, controls the display module 116 to display the terminal information of the mobile terminal 100 and controls to produce at least one of vibration and ring by employing a predetermined call notification algorithm.

When a control command either a call start command or a call end command is input, the control module 118, can control to enable either to operate in the talk mode where a talk with the mobile terminal 100 is possible or to operate in a previous mode among the plurality of modes, based on the control command.

Starting with a talk with the mobile terminal 100 will be described.

When receiving a control command of starting a talk with the mobile terminal 100 from the second smart member 120, the control module 118 can control to display the call information on the display module 116 and control to send the voice signal of a user, which was transformed in the microphone module 114, through the communication module 112.

The second smart member 120 may include an input module 122 which a control command is inputted from a user and a speaker module 124 which transforms the voice signal received from the first smart member 110 to the voice and outputs the voice.

That is, the user can input the control command to the input module 122 by either a physical press of a user's finger or a touch, and it is not limited thereto.

When receiving the call request signal, the input module 122 can stop at least one of the produced vibration and ring and, at the same time, transfer the control command about call start to enable the talk mode.

In the present embodiment, the input module 122 is described as for receiving a control command about a call start command or a call end command, but is not limited thereto. The input module 122 also can receive a command which enables to display user's voice to text, and is not limited thereto.

The speaker module 124, after a control command of call start from the input module 122 is inputted, transforms the voice signal received from the first smart member 110 into voice and outputs the voice so that user is able to recognize.

Here, the first and second smart members 110, 120 can do wired or wireless communication, and is not limited to the present embodiment.

FIG. 3 presents a flow chart of a smart watch operation in accordance with an embodiment of the present invention.

As represented in FIG. 3, the smart watch receives a call request signal S110 from the mobile terminal 100 through the first smart member 110, displays the terminal information of the mobile terminal 100, and produces at least one of vibration and ring S120.

The smart watch corresponds to the call request signal through the second smart member 120 and the first smart member 110 checks whether or not a control command for talk mode has been input S130.

The smart watch, when receiving a control command for a talk mode, displays call information on the first smart member 110, transforms the voice of a user to a voice signal and send it to the mobile terminal 100, and receives voice signal from the mobile terminal 100 140.

The smart watch transforms the voice signal received from the first smart member 110 into voice at the second smart member 120 and outputs it S150.

The smart watch, after S130 step, if a control command for a talk mode is not input, enables to operate in a previous mode among the plurality of modes after checking a call end command.

Detail explanation will be followed with reference to FIG. 1 and FIG. 2.

If the first smart member 110 receives the call request signal sent from the mobile terminal 100, a user recognizes that the first smart member 110 displays terminal information of the mobile terminal 100 and outputs at least one of vibration and ring. The user inputs a control command to make the first smart member 110 to operate in the talk mode by giving it with a finger to the second smart member 120 worn on a finger.

After inputting a control command for a talk mode, the user can proceed a talk with the mobile terminal 100 by bending the arm making the second smart member 120 adjacent to the ear as in FIG. 1.

In the present embodiment described so far, the invention has all the components combined to one, or combined and operated, but is not limited to the present embodiment. That is, as long as not distracting the original intention of the present invention, any component can be selected to combine to operate. In addition, all components can be realized as an individual independent hardware, but also part of or all components can be selected to constitute to a computer program module which performs part of or entire functions which produced by one or a combination of a plurality of hardware. Also, a computer program described above can realize the embodiment of this present invention by being saved in computer readable media that a computer can read such as USB memory device, CD disc, flash memory, and being read and executed by a computer. The computer readable media also can be magnetic recording media, optical recording media, and carrier wave media.

Unless otherwise defined, all terms, including technical terms and scientific terms, used herein have the same meaning as how they are generally understood by those of ordinary skill in the art to which the invention pertains.

Any term that is defined in a general dictionary shall be construed to have the same meaning in the context of the relevant art, and, unless otherwise defined explicitly, shall not be interpreted to have an idealistic or excessively formalistic meaning.

The description so far is only an example of technical ideas of this present invention, so various permutations, modification, or replacement are possible for people who work in the technical area of the present invention as long as not distracting the original intention of the present invention. Therefore the embodiment disclosed in the present invention and the attached diagrams are not for restricting the technical ideas of the present invention but for explaining and the technical ideas of the present invention are not to be restricted by the embodiment and the attached diagrams. The protected scope of the present invention shall be understood by the scope of claims below, and all technical ideas which reside in the scope of claims shall be included in the rights of the present invention.

What is claimed is:

1. A smart watch comprising:
    a first smart member configured to receive a first voice signal from a mobile terminal, transform inputted user's voice to a second voice signal and send the second voice signal to the mobile terminal in a talk mode; and
    a second smart member configured to receive a control command for the talk mode of the first smart member and transform the first voice signal received from the first smart member into voice and output the voice,
    wherein the first smart member comprises:
        a microphone module configured to transform the user's voice to the second voice signal;
        a communication module configured to communicate the second voice signal; and
        a control module configured to control the microphone module and the communication module to proceed a talk with the mobile terminal based on the control command in the talk mode.

2. The smart watch of claim 1, wherein the first smart member comprises a display module configured to display at least one of terminal information, call information, time information, date information, email information, and text message information of the mobile terminal.

3. The smart watch of claim 1, wherein the communication module is configured to receive a call request signal sent from the mobile terminal before receiving the second voice signal.

4. The smart watch of claim 1, wherein the communication module is configured to receive a call request signal sent from the mobile terminal before receiving the second voice signal, and
wherein the control module, when receiving the call request signal, is configured to control to produce at least one of vibration and ring by employing a predetermined call notification algorithm.

5. The smart watch of claim 4, wherein the first smart member comprises a display module configured to display at least one of terminal information, call information, time information, date information, email information, and text message information of the mobile terminal, and
wherein, when receiving the call request signal, the control module is configured to control to display the terminal information on the display module, and, when the control command is transferred from the second smart member, is configured to control to display the call information on the display module by enabling the first smart member to be in the talk mode.

6. The smart watch of claim 5, wherein the terminal information comprises at least one of a user name and mobile number of the mobile terminal, and,
wherein the call information comprises at least one of call start time and call elapse time of the mobile terminal.

7. The smart watch of claim 1, wherein the second smart member comprises:
an input module configured to receive the control command input from the user; and
a speaker module configured to transform the first voice signal received from the first smart member into voice and output the voice.

8. The smart watch of claim 7, wherein the first smart member is configured to receive a call request signal sent from the mobile terminal before receiving the first voice signal and produce at least one of vibration and ring by employing a predetermined call notification algorithm, and
wherein the input module, when at least one of the vibration and ring is produced from the first smart member, is configured to receive the control command for the talk mode.

9. The smart watch of claim 1, comprising a connection member configured to connect the first and second smart members electrically and transfer the control command and the first voice signal.

10. The smart watch of claim 1, wherein the second smart member is configured to perform near field communication with the first smart member.

* * * * *